(12) United States Patent
Zorn et al.

(10) Patent No.: US 6,899,035 B2
(45) Date of Patent: May 31, 2005

(54) RAIL-MOUNTED TRANSPORT SYSTEM

(75) Inventors: Michael Zorn, Selters (DE); Erik Lindig, Kelkheim (DE)

(73) Assignee: Duerr Automotion GmbH, Stuttgart (DE)

( * ) Notice: Subject to any disclaimer, the term of this patent is extended or adjusted under 35 U.S.C. 154(b) by 0 days.

(21) Appl. No.: 10/794,095

(22) Filed: Mar. 5, 2004

(65) Prior Publication Data

US 2004/0168604 A1 Sep. 2, 2004

Related U.S. Application Data

(63) Continuation of application No. PCT/EP02/12992, filed on Nov. 20, 2002.

(30) Foreign Application Priority Data

Dec. 5, 2001 (DE) .......................................... 101 59 678

(51) Int. Cl.[7] .............................................. E01B 25/06
(52) U.S. Cl. ........................ 104/130.01; 191/6; 340/310
(58) Field of Search ........................ 104/130.01, 130.02, 104/130.03, 130.06, 96; 191/33 R, 38, 2, 6; 198/60; 340/310.06

(56) References Cited

U.S. PATENT DOCUMENTS

| | | | | |
|---|---|---|---|---|
| 3,696,752 A | | 10/1972 | Bourg | |
| 3,834,315 A | * | 9/1974 | Warner | 104/88.01 |
| 3,927,619 A | * | 12/1975 | Bradley | 104/130.06 |
| 4,109,584 A | * | 8/1978 | Mihirogi | 104/130.06 |
| 5,594,316 A | * | 1/1997 | Hayashida | 49/31 |
| 5,886,619 A | * | 3/1999 | Takasan et al. | 340/310.06 |
| 5,886,691 A | * | 3/1999 | Furuya et al. | 715/721 |

FOREIGN PATENT DOCUMENTS

| | | | | |
|---|---|---|---|---|
| CH | 333784 | | 12/1958 | |
| DE | 29 11 067 C2 | | 10/1979 | |
| DE | 33 02 266 C2 | | 7/1984 | |
| EP | 0 153 573 A2 | | 9/1985 | |
| EP | 153573 A2 | * | 9/1985 | ........... E01B/25/26 |
| GB | 2 018 210 A | | 10/1979 | |
| GB | 2018210 A | * | 10/1979 | ............. B61B/3/02 |
| GB | 2 133 755 A | | 8/1984 | |
| GB | 2133755 A | * | 8/1984 | ........... E01B/25/26 |
| JP | 5271008 A | * | 10/1993 | |

* cited by examiner

*Primary Examiner*—Frantz F. Jules
(74) *Attorney, Agent, or Firm*—Leydig, Voit & Mayer, Ltd.

(57) ABSTRACT

In order to provide a rail-mounted transport system, in particular an overhead monorail, comprising at least one active track switch, which comprises at least two movable rail portions that are selectively bringable into an operating position, in which the movable rail portion situated in the operating position connects in each case two fixed rail portions of the transport system to one another, and comprising at least one vehicle, which is movable along the rail portions of the transport system and comprises at least one power transmission unit for the contact-free transmission of power from power supply lines of the transport system to the vehicle, wherein the power supply to the vehicles in the region of an active track switch is achievable in a simple manner, it is proposed that the vehicle comprises at least two power transmission units, which are spaced apart from one another in the direction of travel of the vehicle, wherein the distance between the power transmission units is greater than the length of the movable rail portions of the active track switch.

18 Claims, 8 Drawing Sheets

RAIL-MOUNTED TRANSPORT SYSTEM

FIELD OF INVENTION

The invention relates to a rail-mounted transport system, and more particularly to an overhead monorail.

BACKGROUND OF THE INVENTION

The present invention relates to a rail-mounted transport system, in particular an overhead monorail, comprising at least one active track switch, which comprises at least two movable rail portions that are selectively bringable into an operating position, in which the movable rail portion situated in the operating position connects in each case two fixed rail portions of the transport system to one another, and comprising at least one vehicle, which is movable along the rail portions of the transport system and comprises at least one power transmission unit for the contact-free transmission of power from power supply lines of the transport system to the vehicle.

Such rail-mounted transport systems, in particular overhead monorails, are known from prior art.

Here, by a "active track switch" is meant a switch having movable rail portions, whereas in the case of a "passive track switch" all of the rail portions are stationary and, instead, the rail portion to be travelled along by the vehicle is selected by switching over a guide device provided on the vehicle.

An active track switch for an overhead monorail are known e.g. from DE 33 02 266 C2. In the overhead monorail known from DE 33 02 266 C2 the power required for operation is supplied to the vehicles of the overhead monorail via carbon brushes, which are disposed on the vehicle and in electrically conductive contact with collector conductors running along the running rails of the overhead monorail. The movable rail portions of the active track switch of said overhead monorail are also provided with such collector conductors, which have to be connected by means of flexible trailing cables to a stationary power source in order to enable the mobility of the movable rail portions.

In an overhead monorail with a contacting power supply such a coupling of the movable rail portions of an active track switch to a stationary power source may be effected relatively easily and reliably because such an overhead monorail is operated with alternating current of a low frequency (usually 50 Hz or 60 Hz).

In a rail-mounted transport system with contact-free, e.g. inductive, transmission of power from the power supply lines to the vehicles of the transport system, however, such flexible cabling in active track switches is very costly since such transport systems are operated with alternating current in the medium frequency range (e.g. 25 kHz) and therefore flexible cables suitable for medium-frequency currents have to be used for the power supply to the active track switch. If, in addition to a power supply to the vehicles, the transmission of data to the vehicles in the region of the active track switch is desired, then flexible high-frequency cables (for transmitting currents in the MHz range or even in the GHz range) have to be additionally provided. Highly flexible medium-frequency and high-frequency cables are, however, complicated and expensive to manufacture.

SUMMARY AND OBJECTS OF THE INVENTION

The underlying object of the present invention is therefore to provide a rail-mounted transport system of the initially described type, in which the power supply to the vehicles in the region of an active track switch is achievable in a simple manner.

In a rail-mounted transport system having the features of the preamble of claim 1 said object is achieved according to the invention in that the vehicle comprises at least two power transmission units, which are spaced apart from one another in the direction of travel of the vehicle, wherein the distance between the power transmission units is greater than the length of the movable rail portions of the active track switch.

With the solution according to the invention it is guaranteed that during passage through the active track switch there is always at least one of the power transmission units of the vehicle situated in the region of one of the fixed rail portions of the transport system, so that the relevant power transmission unit may take up power from the current supply line associated with the relevant fixed rail portion. An adequate supply of power to the vehicle is therefore guaranteed even when the respective other power transmission unit is situated in the region of the movable rail portions of the active track switch. With the transport system according to the invention it is therefore possible to dispense with providing the movable rail portions of ab active track switch with current supply lines. Consequently, the need to connect such current supply lines of a movable rail portion by flexible medium-frequency and high-frequency cables to stationary power sources is also eliminated. It is therefore possible to dispense entirely with the costly flexible cabling of the active track switches that is required in conventional rail-mounted transport systems with contactless power transmission. This reduces the material- and assembly outlay for an active track switch of such a transport system considerably and moreover increases the reliability of the power supply to the vehicle because at any one time at least one of the power transmission units of the vehicle can draw power from the current supply line of a fixed rail portion of the transport system.

The vehicle may in said case also comprise more than two power transmission units, although it then has to be guaranteed that, in the case of at least one pair of power transmission units, the distance between the power transmission units of the pair is greater than the length of the movable rail portions of the active track switch.

When it is provided that the current supply lines of the fixed rail portions terminate already at a specific distance from the active track switch, then the distance between the power transmission units of the vehicle has to be greater than the length of the section free of power supply lines during passage through the active track switch.

In the case of the overhead monorail known from DE 33 02 266 C2 it would not be possible to dispense with the current supply lines on the movable rail portions of the active track switch because the power supply to the vehicle in said overhead monorail is effected by sliding contacts in contact with a collector conductor and said sliding contacts of the vehicle require mechanical guidance at all times.

As already stated, in a transport system according to the invention it is no longer necessary to provide the movable rail portions of an active track switch with current supply lines.

In a preferred development of the invention it is therefore provided that at least one of the movable rail portions of the active track switch has no current supply line.

It is particularly advantageous when none of the movable rail portions of the active track switch has a current supply line.

The vehicle of the transport system according to the invention advantageously comprises at least two carriages, which are connected to one another and pivotable relative to one another about at least one pivotal axis. It is thereby guaranteed that, even in the case of longer vehicles, each of the carriages is aligned with its longitudinal direction substantially parallel to the local longitudinal direction of the running rail of the transport system.

To enable the vehicle of the transport system to negotiate bends lying in various planes aligned transversely relative to one another, it is advantageously provided that the carriages of the vehicle are pivotable relative to one another about at least two pivotal axes aligned transversely, preferably perpendicular, relative to one another.

In particular, it may be provided that the vehicle comprises a cross member, by means of which in each case two carriages of the vehicle are connected to one another, wherein each of the carriages is pivotable relative to the cross member about at least one pivotal axis.

It is particularly advantageous when each of the carriages is pivotable relative to the cross member about at least two pivotal axes aligned transversely, preferably perpendicular, relative to one another.

In a preferred development of the invention it is provided that the at least two carriages of the vehicle are provided with, in each case, at least one power transmission unit.

It is particularly advantageous when the at least two power transmission units of the vehicle are connected to a common electronic control device, which regulates the transmission of power to the vehicle in dependence upon how many of the power transmission units are in engagement with a current supply line of the transport system. It is thereby ensured that the necessary electric power is transmitted to the vehicle independently of whether only one or whether both power transmission units are in engagement with a current supply line of the transport system.

It may further be provided that there is associated with each power transmission unit in each case one data transmission unit, wherein the data transmission units of the vehicle communicate with stationary data transmission units in order to receive data for control of the vehicle or to transmit data regarding operation of the vehicle.

The data transmission units associated with the power transmission units are preferably likewise spaced apart from one another in the direction of travel by a distance that is greater than the length of the movable rail portions of the active track switch.

Further features and advantages of the invention are the subject matter of the following description and graphic representation of an embodiment.

BRIEF DESCRIPTION OF THE DRAWINGS

Identical or functionally equivalent elements are denoted by the same reference characters in all of the drawings.

DETAILED DESCRIPTION OF EMBODIMENTS

Figure 1:
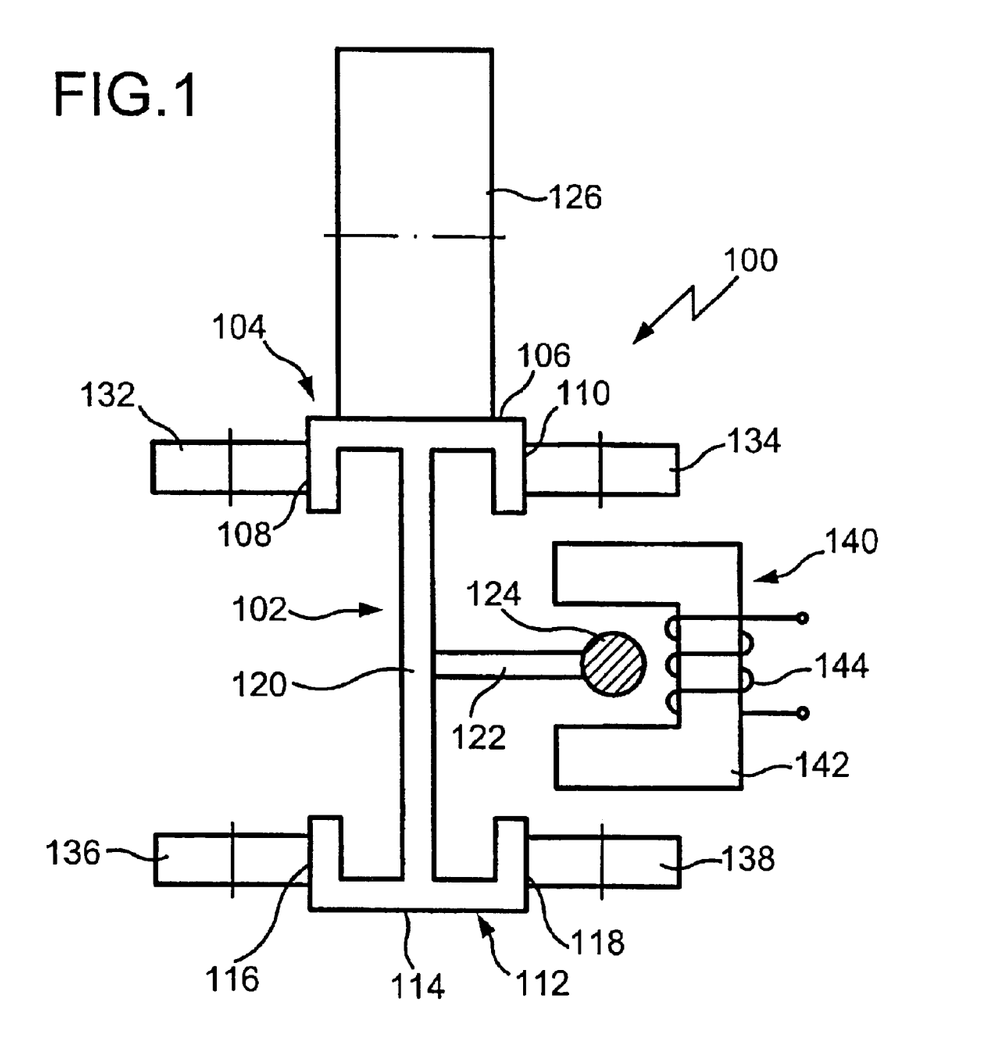
FIG. 1 is a diagrammatic cross section through a running rail of an overhead monorail with a diagrammatic view of the support- and guide rollers and a power transmission unit of a carriage of the overhead monorail.

An overhead monorail denoted as a whole by 100 comprises a running rail 102, which is shown in cross section in FIG. 1 and comprises an upper flange 104 having a top, substantially flat running surface 106 and two lateral guide surfaces 108 and 110 as well as a lower flange 112 having a bottom flat running surface 114 and two lateral guide surfaces 116 and 118.

Both flanges at their opposite sides to the running surfaces are connected to one another by a vertical web 120, the walls of which are flat and extend parallel to the running rail longitudinal direction.

Midway between the two flanges 104 and 112 a current supply line support 122 formed from an electrically insulating material projects from a side wall of the web 120 and carries on its end remote from the web 120 a current supply line 124.

Figure 2:
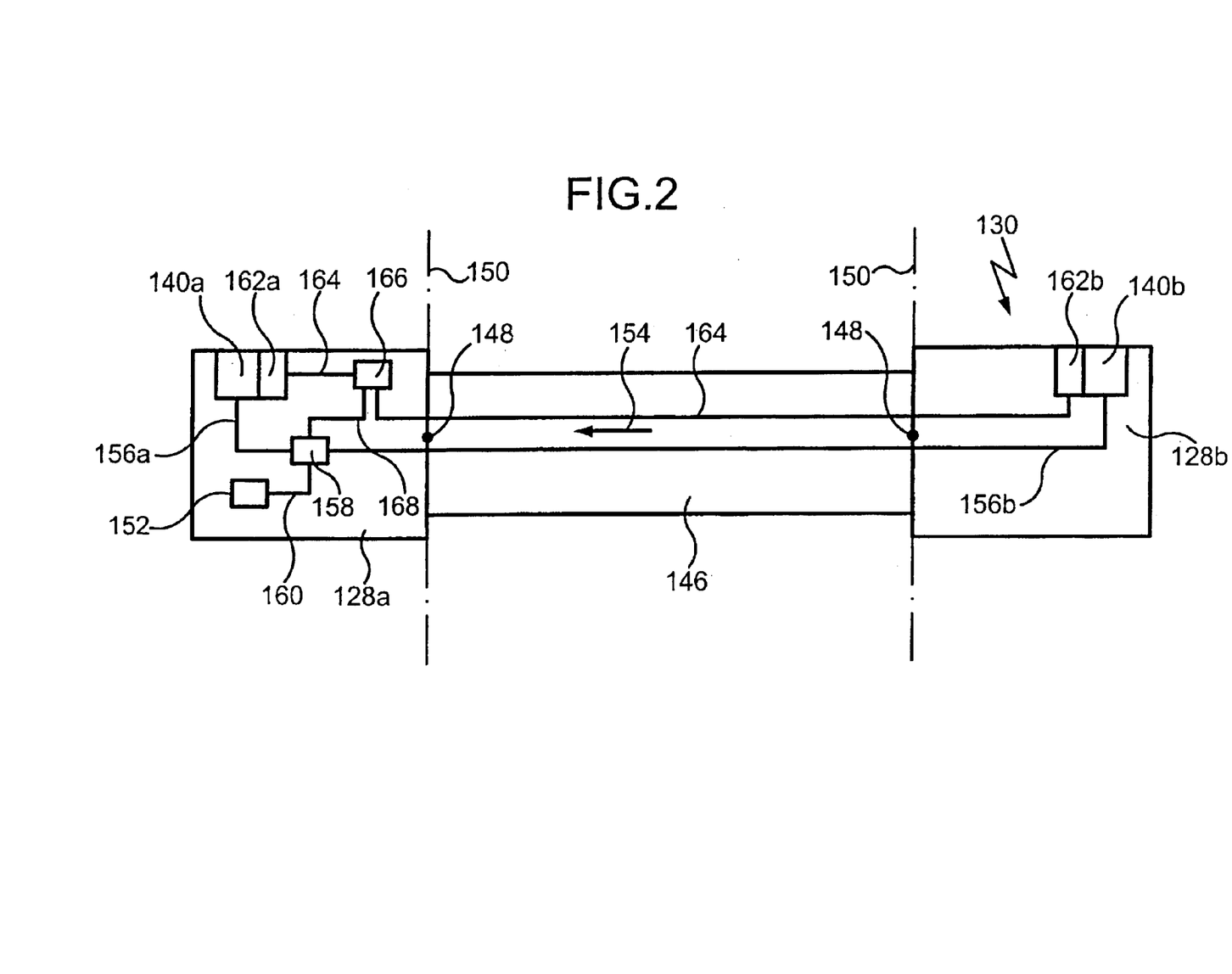
FIG. 2 is a diagrammatic view of a vehicle of the overhead monorail that comprises two carriages connected in an articulated manner to one another by a cross member.

A support roller 126 of a carriage 128 of a vehicle 130, diagrammatically illustrated in FIG. 2, of the overhead monorail 100 rolls along the top running surface 106 of the running rail 102.

Of said carriage 128, besides the support roller 126 FIG. 1 shows only lateral guide rollers 132, 134, 136 and 138, which roll against the lateral guide surfaces 108, 110, 116 and 118 respectively, as well as a power transmission unit 140 comprising e.g. a current collector 142, which is fashioned as a U-shaped ferrite core and on which is disposed a conductor winding 144, which is connected to a current-collector electronic circuit (not shown in FIG. 1) for converting an alternating current induced in the conductor winding into a direct voltage.

The current supply line 124 extends without contact into the U-shaped current collector 142 of the power transmission unit 140.

Power transmission from the current supply line 124 to the power transmission unit 140 is effected by induction. To said end, a medium-frequency alternating current is fed into the current supply line 124 and the running rail 102 serving as a return conductor and generates a correspondingly temporally varying magnetic flux in the current collector 142, so that an alternating current is induced in the conductor winding 144 and can be converted in the carriage 128 into a direct voltage for drive and control purposes.

A vehicle 130 of the overhead monorail 100 that is used to transport loads along the running rail 102 of the overhead monorail 100 is illustrated purely diagrammatically in FIG. 2.

The vehicle 130 comprises a front carriage 128*a* and a rear carriage 128*b*, which are connected to one another by a cross member 146.

The cross member 146 comprises universal joints (not specifically illustrated), which make it possible for the two carriages 128*a* and 128*b* to pivot relative to one another about, in each case, a vertical pivotal axis 148 and about, in each case, a horizontal pivotal axis 150 perpendicular thereto, so that the vehicle 130 may negotiate both bends lying in a horizontal plane and bends lying in a vertical plane.

Each of the carriages 128a, 128b is supported by means of support rollers 126 on the running rail 102 and is guided by means of guide rollers 132, 134, 136 and 138 on the lateral guide surfaces of the running surface 102.

The front carriage 128a is moreover drivable by means of a drive unit 152, which may take the form of e.g. a friction wheel drive.

It would also be possible to provide the rear carriage 128a so with a separate drive unit.

For taking up power for operation of the respective carriage 128 each of the carriages has one power transmission unit 140a and/or 140b, which power transmission units are spaced apart from one another in longitudinal direction 154 of the carriage 128.

Both power transmission units 140a, 140b are connected by lines 156a and 156b respectively to a common collector electronic circuit 158, which in the presently described embodiment is disposed on the front carriage 128a but might equally well be disposed on the cross member 146 or on the rear carriage 128b.

The collector electronic circuit 158 is in turn connected by a line 160 to the drive unit 152.

There is further associated with each of the power transmission units 140a, 140b a data transmission unit 162a and/or 162b, wherein each of said data transmission units of the carriages 128a, 128b communicates with stationary data transmission units disposed along the running rail 102 of the overhead monorail 100 in order to receive or transmit data.

Each of the data transmission units 162a, 162b is connected by a data line 164 to a common communication module 166, which in the presently described embodiment is disposed on the front carriage 128a but might alternatively be disposed on the rear carriage 128b or on the cross member 146.

The communication module 166 is connected by a line 168 to the collector electronic circuit 158.

Figure 3:
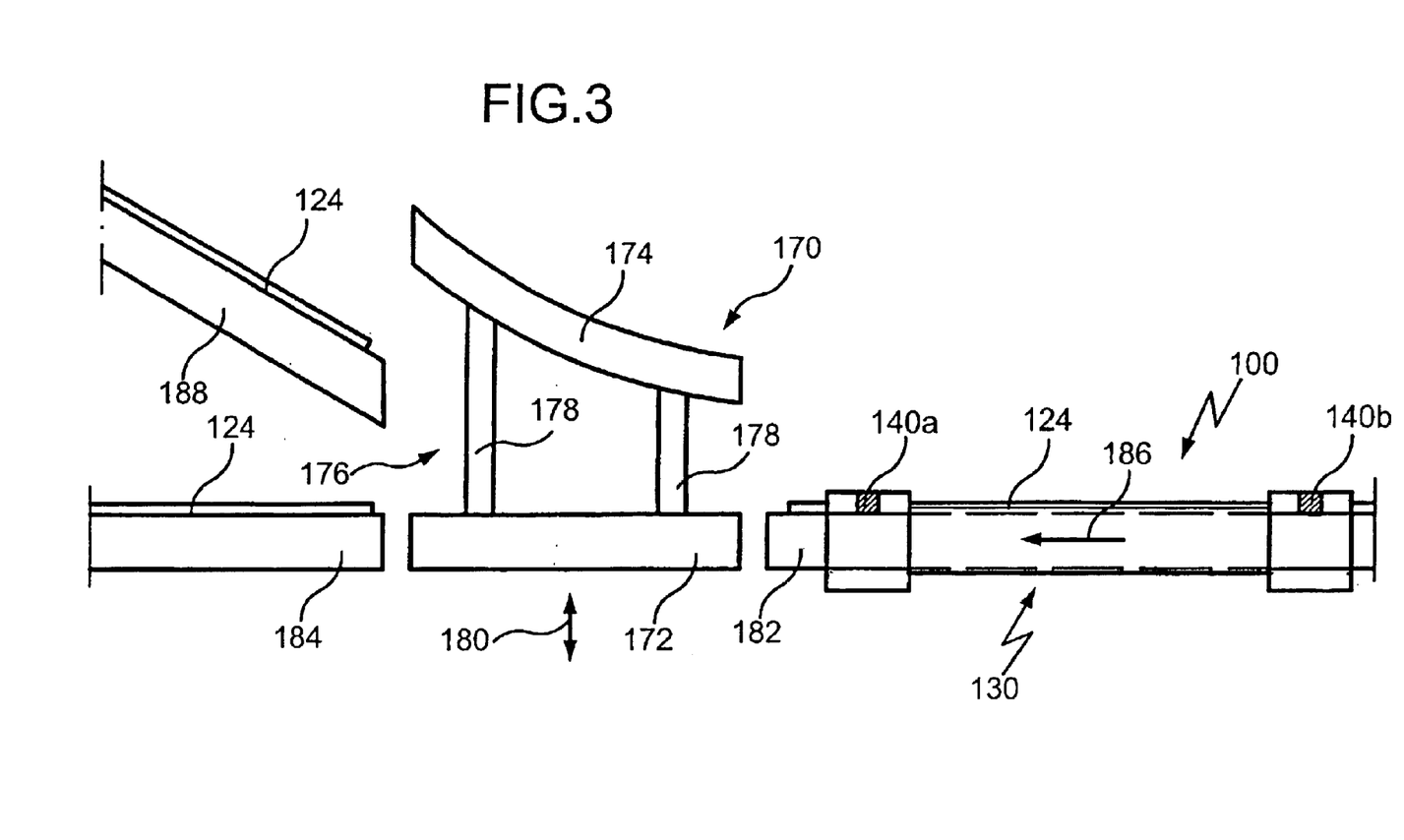
FIG. 3 is a diagrammatic view of an active track switch of the overhead monorail comprising three fixed rail portions adjoining the track switch, wherein a rectilinear movable rail portion of the active track switch is situated in an operating position, in which said movable rail portion connects two fixed rail portions to one another.
Figure 4:
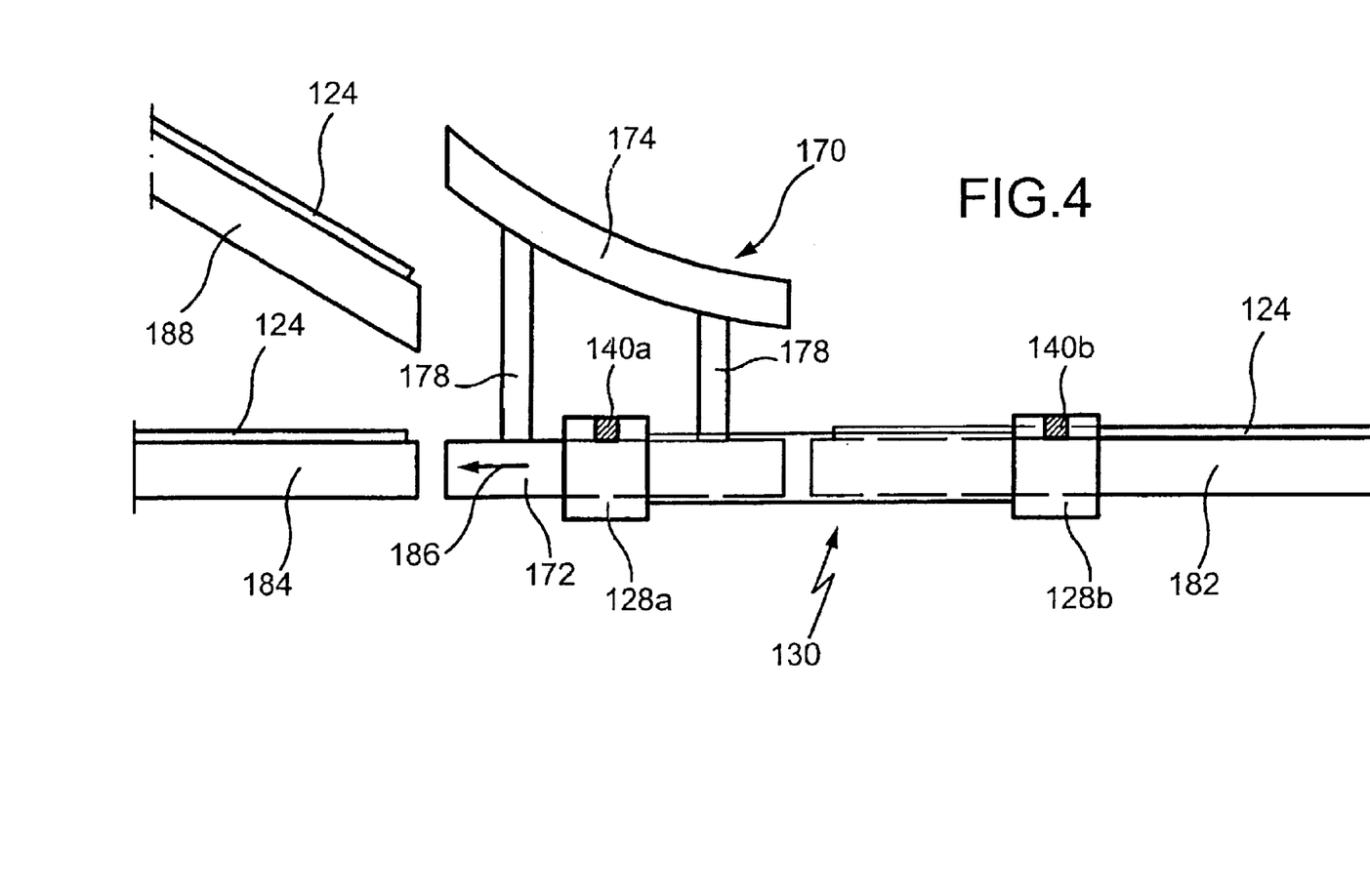
FIGS. 4 to 6 are diagrammatic representations of successive phases of the passage of a vehicle of the overhead monorail through the rectilinear movable rail portion of the active track switch.

In FIG. 3 an active track switch of the overhead monorail 100 is shown, which is denoted as a whole by 170 and comprises a rectilinear movable rail portion 172 and a curved movable rail portion 174, both of which are disposed on a movable frame 176 that is indicated in FIG. 3 by two struts 178.

Figure 5:
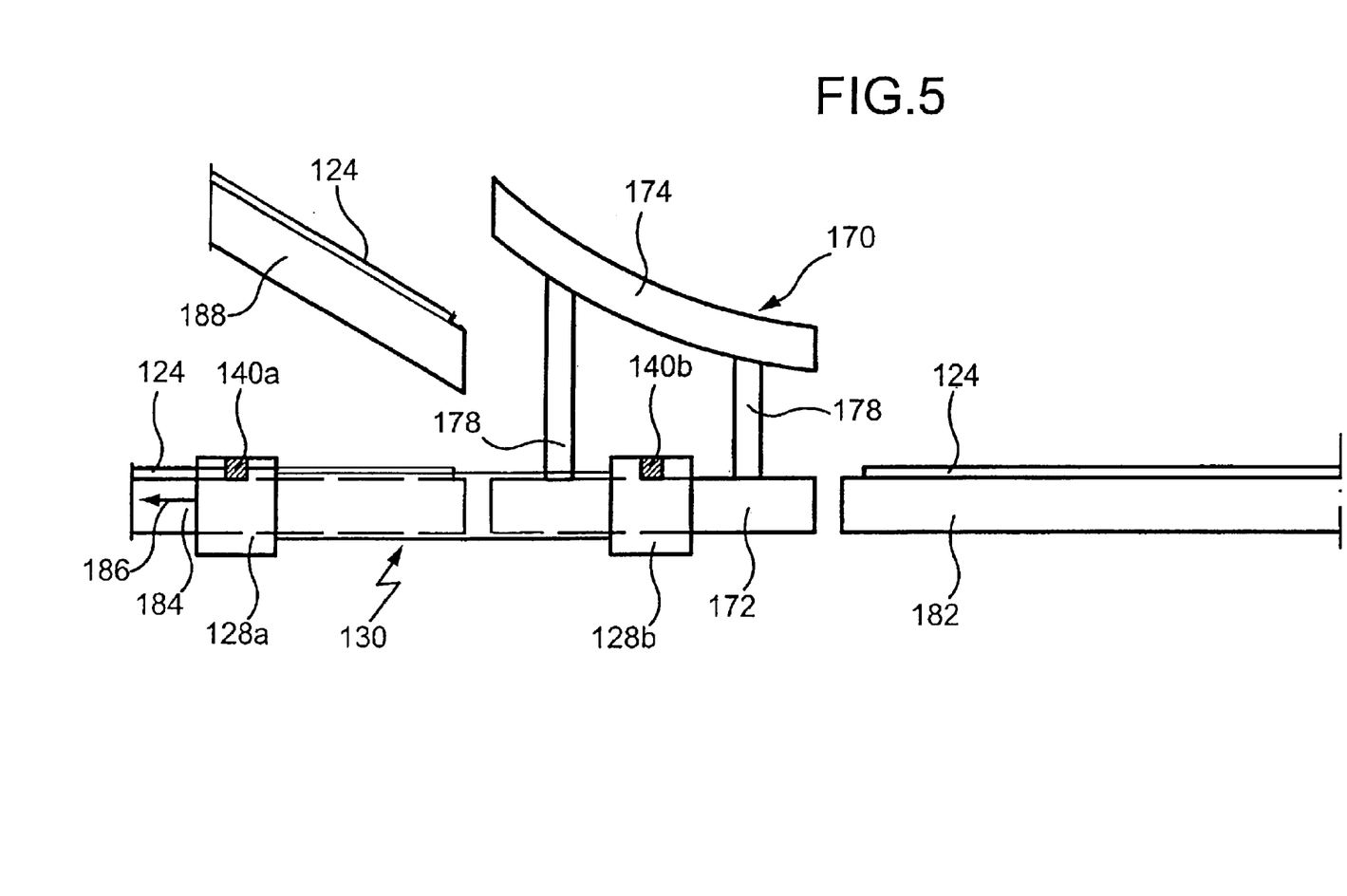
Figure 6:
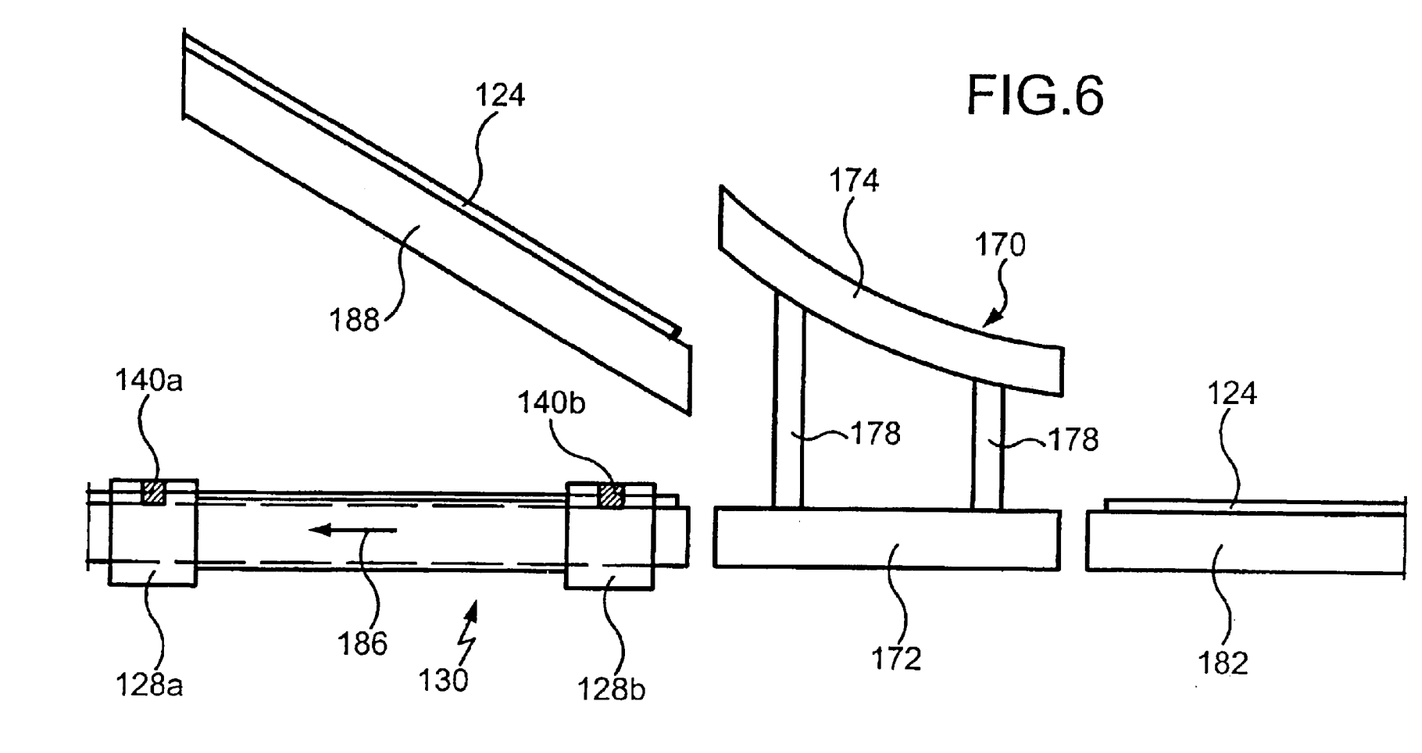
Figure 7:
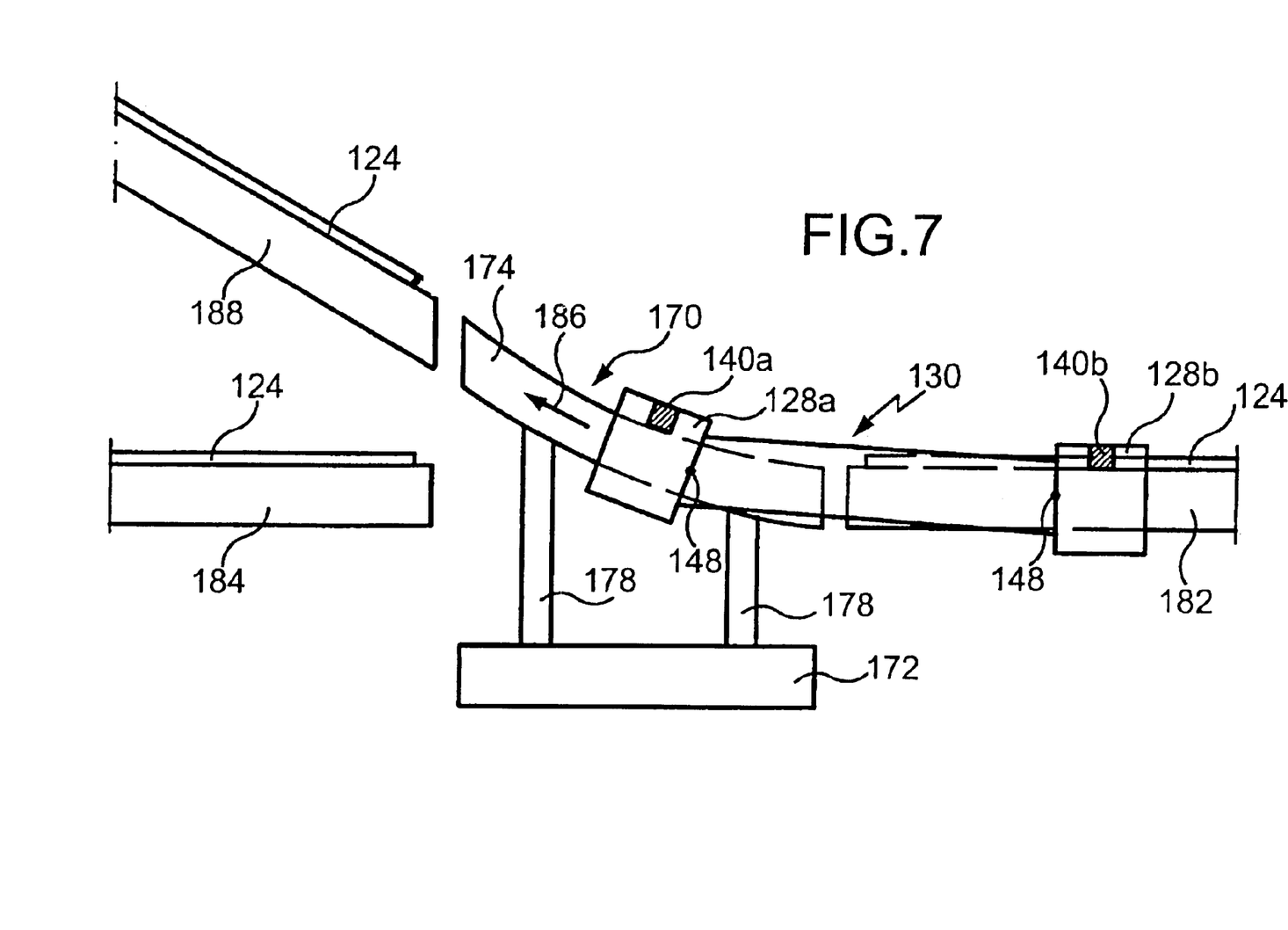
FIGS. 7 and 8 are diagrammatic views of successive phases of the passage of a vehicle of the overhead monorail through a curved movable rail portion of the active track switch.
Figure 8:
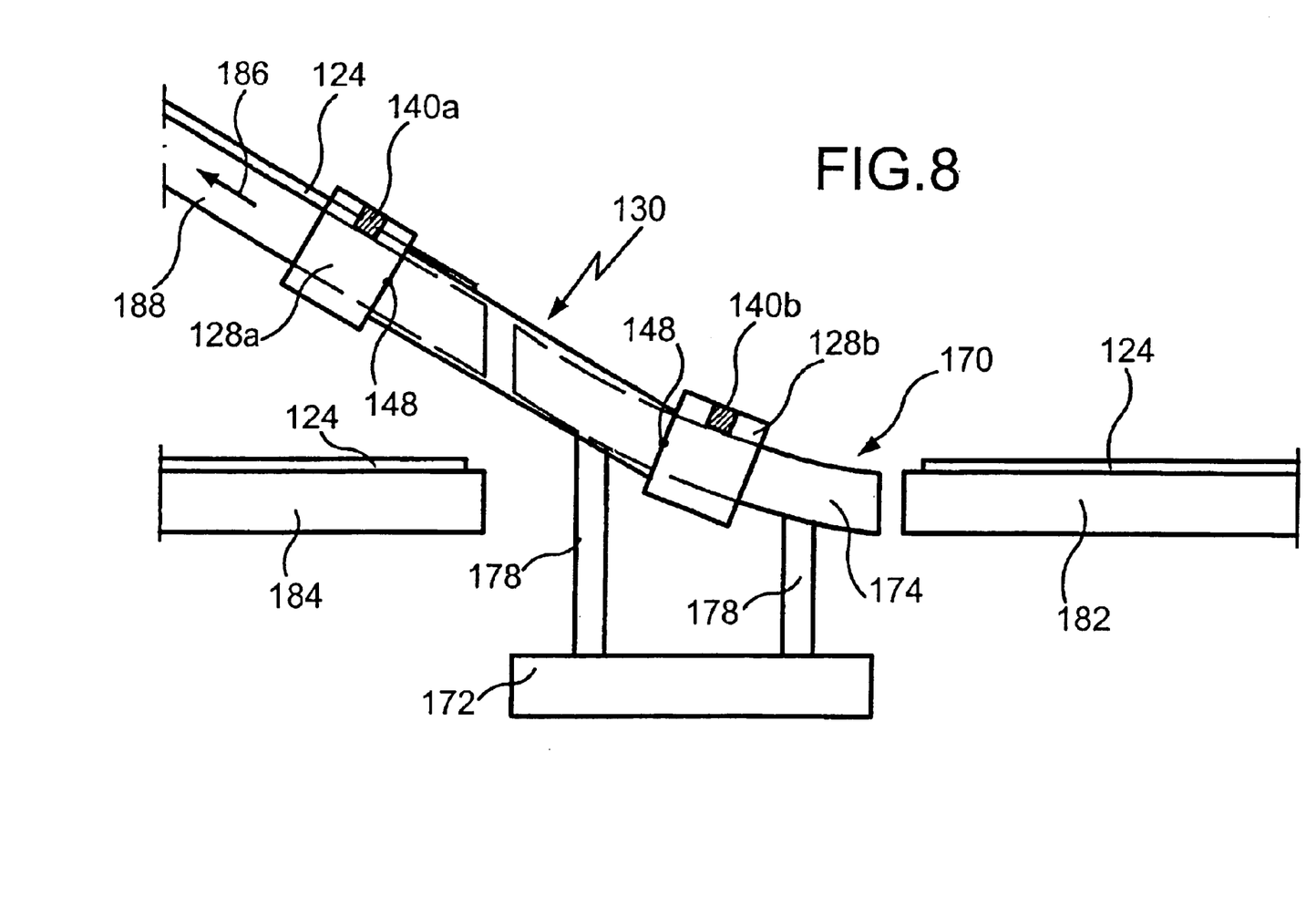

The movable frame 176 is displaceable by means of a moving device (not shown) in a displacement direction 180 extending at right angles to the longitudinal direction of the rectilinear movable rail portion 172 in order to move the active track switch 170 from a first position shown in FIGS. 3 to 6 into a second position shown in FIGS. 7 and 8 or from the second position back into the first position.

In the first position of the active track switch 170 shown in FIGS. 3 to 6 the rectilinear movable rail portion 172 of the active track switch 170 is situated in an operating position, in which the rectilinear movable rail portion 172 connects a first fixed rail portion 182 (disposed in FIG. 3 to the right of the active track switch 170) in such a way to a second fixed rail portion 184 (illustrated in FIG. 3 to the left of the active track switch 170) that a vehicle 130 moving along the first rail portion 182 in travel direction 186 can transfer to the second fixed rail portion 184 by moving across the rectilinear movable rail portion 172.

In said first position of the active track switch 170 the curved movable rail portion 174 is situated in an inoperative position, in which said movable rail portion does not connect any fixed rail portions to one another.

In the second position of the active track switch 170 illustrated in FIGS. 7 and 8 the rectilinear movable rail portion 172 is situated in an inoperative position, in which said rail portion does not connect any fixed rail portions to one another, while the curved movable rail portion 174 is situated in an operating position, in which the curved movable rail portion 174 connects the first fixed rail portion 182 in such a way to a third fixed rail portion 188 (illustrated in FIG. 7 to the left of the active track switch 170) that a vehicle 130 coming from the direction of the first fixed rail portion 182 may transfer via the curved movable rail portion 174 to the third fixed rail portion 188.

The longitudinal direction of the third fixed rail portion 188 together with the longitudinal directions of the first fixed rail portion 182 and the second fixed rail portion 184 includes an acute angle of e.g. approximately 30°.

As is apparent from FIG. 3, all of the fixed rail portions 182, 184 and 188 are each provided with a current supply line 124 running parallel to the respective running rail, so that the vehicle 130 may take up power so long as at least one of its power transmission units 140a, 140b is in engagement with one of said current supply lines 124.

The rectilinear movable rail portion 172 and the curved movable rail portion 174 of the active track switch 170, on the other hand, are not provided with such a current supply line 124. It is therefore not necessary for costly flexible cabling, which simultaneously enables a supply of current to the movable rail portions of the active track switch 170 and the requisite displaceability of said movable rail portions, to be provided on the active track switch 170.

Despite the absence of current supply lines in the region of the active track switch 170, as the vehicle 130 passes through the active track switch 170 trouble-free power transmission to the vehicle 130 is guaranteed at all times because the distance between the two power transmission units 140a, 140b of the vehicle 130 is greater than the current-supply-free section between the first fixed rail portion 182 and the second fixed rail portion 184 and/or between the first fixed rail portion 182 and the third fixed rail portion 188.

There now follows a description of the passing of the vehicle 130 through the active track switch 170 with reference to FIGS. 3 to 8:

In the state illustrated in FIG. 3 the active track switch 170 are situated in their first position, in which the rectilinear movable rail portion 172 is situated in the operating position. The vehicle 130 is moving along the first rail portion 182 in travel direction 186 towards the active track switch 170, wherein both power transmission units 140a, 140b are in engagement with the current supply line 124 of the first fixed rail portion 182, with the result that power transmission to the vehicle 130 is guaranteed.

Then the front carriage 128a of the vehicle 130 leaves the first fixed rail portion 182 and transfers to the rectilinear movable rail portion 172 of the active track switch 170, with the result that power can no longer be transmitted by means of the power transmission unit 140a to the vehicle 130. The power transmission unit 140b of the rear carriage 128b is however still in engagement with the current supply line 124 of the first fixed rail portion 182 so that power transmission to the vehicle 130 is still possible (see FIG. 4).

In the state illustrated in FIG. 5 the front carriage 128a has transferred from the rectilinear movable rail portion 172 of the active track switch 170 to the second fixed rail portion 184, with the result that its power transmission unit 140 is in engagement with the current supply line 124 of the second fixed rail portion 184 and power transmission to the vehicle 130 is guaranteed.

The rear carriage 128b is situated on the rectilinear movable rail portion 172 of the active track switch 170, with the result that its power transmission unit 140b is unable to take up power.

In the state illustrated in FIG. 6 the rear carriage 128b has also transferred from the active track switch 170 to the second fixed rail portion 184, with the result that once more both power transmission units 140a, 140b are in engagement with the current supply line 124 of the second fixed rail portion 184 and a power supply to the vehicle 130 is guaranteed.

During passage through the active track switch 170 the collector electronic circuit 158, to which both power transmission units 140a, 140b are connected, ensures that the electric power needed to operate the vehicle 130 is transmitted independently of whether at a given time only one power transmission unit 140 or both power transmission units 140a, 140b are in engagement with a current supply line 124.

FIGS. 7 and 8 show the vehicle 130 as it is passing through the curved movable rail portion 174 of the active track switch 170.

In the state shown in FIG. 7 the active track switch 170 is situated in its second position, in which the curved movable rail portion 174 is situated in the operating position.

The front carriage 128a has already transferred from the first fixed rail portion 182 to the curved movable rail portion 174, with the result that its power transmission unit 140a is no longer in engagement with a current supply line. An adequate power supply to the vehicle 130 is however guaranteed by the power transmission unit 140b of the rear carriage 128b, which is in engagement with the current supply line 124 of the first fixed rail portion 182.

As is apparent from FIG. 7, the longitudinal directions of the two carriages 128a, 128b are always aligned parallel to the longitudinal direction of the respective rail portion, on which the relevant carriage is actually situated. This is achieved by a corresponding pivoting of the carriages 128, 128b relative to the cross member 146 about the vertical pivotal axes 148.

Were the curved movable rail portion 174 of the active track switch 170 to extend along a vertical plane, the same effect would be achieved by a pivoting of the carriages 128a, 128b about the horizontal pivotal axes 150.

In the state illustrated in FIG. 8 the front carriage 128a has transferred from the curved movable rail portion 174 to the third fixed rail portion 188, with the result that its power transmission unit 140a is in engagement with the current supply line 124 of the third fixed rail portion 188 and an adequate power supply to the vehicle 130 is guaranteed. The rear carriage 128b has transferred from the first fixed rail portion 182 to the curved movable rail portion 174 of the active track switch 170, with the result that its power transmission unit 140b is no longer in engagement with a current supply line 124.

What is claimed is:

1. Rail-mounted transport system for connection with power supply lines, comprising
    a plurality of fixed rail portions,
    at least one active track switch comprising at least two movable rail portions having a length, the movable rail portions being selectively movable into an operating position, each of said movable rail portions connecting a respective pair of said fixed rail portions to one another when disposed in the operating position, and
    at least one vehicle said vehicle being movable along the rail portions of the transport system and comprising at least one power transmission unit transmitting power from power supply lines to the vehicle in a contact-free arrangement,
    the vehicle comprising at least two carriages connected to one another and pivotable relative to one another about at least one pivotal axis, and at least a second power transmission unit spaced apart from the first power transmission unit in a direction of travel of the vehicle, wherein the distance between the power transmission units is greater than the length of the movable rail portions of the active track switch.

2. The transport system according to claim 1, wherein at least one of the movable rail portions of the active track switch has no current supply line.

3. The transport system according to claim 2, wherein none of the movable rail portions of the active track switch has a current supply line.

4. The transport system according to claim 1, wherein the carriages are pivotable relative to one another about at least two pivotal axes aligned transversely relative to one another.

5. The transport system according to claim 4, wherein the pivotal axes are aligned perpendicularly relative to one another.

6. The transport system according to claim 1, wherein the at least two carriages are each provided with at least one power transmission unit.

7. The transport system according to claim 1, wherein the at least two power transmission units are connected to a common electronic control device, the common electronic control device regulating power transmission to the vehicle in dependence upon the number of the power transmission units that are in engagement with a current supply line of the transport system.

8. The transport system according to claim 1, wherein at least one data transmission unit is associated with each power transmission unit.

9. The transport system according to claim 1, wherein said transport system is an overhead monorail.

10. Rail-mounted transport system for connection with power supply lines, comprising
    a plurality of fixed rail portions,
    at least one active track switch, comprising at least two movable rail portions having a length, the movable rail portions being selectively movable into an operating position, each of said movable rail portions connecting a respective pair of said fixed rail portions to one another when disposed in the operating position, and
    at least one vehicle, said vehicle being movable along the rail portions of the transport system and comprising at least one power transmission unit transmitting power from power supply lines to the vehicle in a contact-free arrangement,
    the vehicle comprising at least a second power transmission unit spaced apart from the first power transmission unit in a direction of travel of the vehicle, wherein the distance between the power transmission units is greater than the length of the movable rail portions of the active track switch and wherein at least one data transmission unit is associated with each power transmission unit.

11. The transport system according to claim 10, wherein at least one of the movable rail portions of the active track switch has no current supply line.

12. The transport system according to claim 11, wherein none of the movable rail portions of the active track switch has a current supply line.

13. The transport system according to claim 10, wherein the vehicle comprises at least two carriages connected to one another and pivotable relative to one another about at least one pivotal axis.

14. The transport system according to claim 13, wherein the carriages are pivotable relative to one another about at least two pivotal axes aligned transversely relative to one another.

15. The transport system according to claim 14, wherein the pivotal axes are aligned perpendicularly relative to one another.

16. The transport system according to claim 13, wherein the at least two carriages are each provided with at least one power transmission unit.

17. The transport system according to claim 10, wherein the at least two power transmission units are connected to a common electronic control device, the common electronic control device regulating power transmission to the vehicle in dependence upon the number of the power transmission units that are in engagement with a current supply line of the transport system.

18. The transport system according to claim 10, wherein said transport system is an overhead monorail.

\* \* \* \* \*